C. S. LENZ.
SOUNDING APPARATUS.
APPLICATION FILED MAR. 13, 1909.

959,764.

Patented May 31, 1910.

2 SHEETS—SHEET 1.

Witnesses
J. T. L. Wright
James B. Loehl

Inventor
Charles S. Lenz,
by Victor J. Evans,
Attorney

C. S. LENZ.
COUNTING APPARATUS.
APPLICATION FILED MAR. 13, 1909.
959,764.
Patented May 31, 1910.
2 SHEETS—SHEET 2.
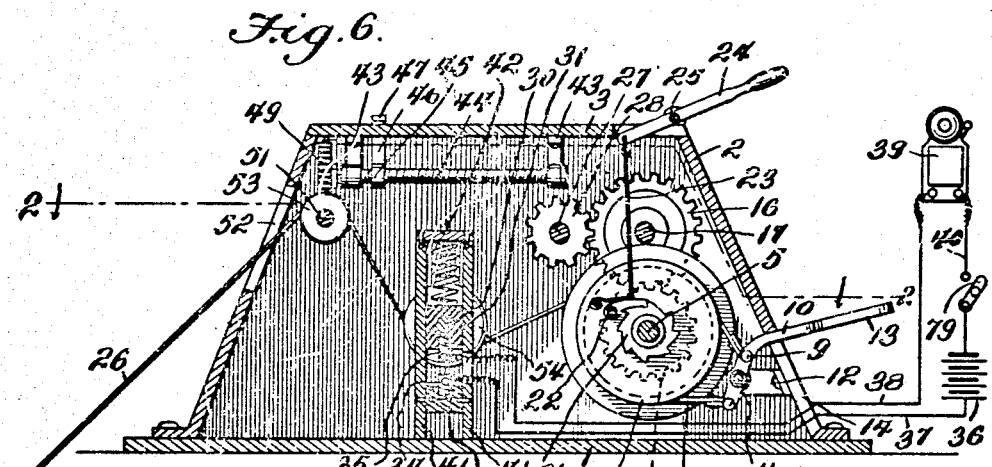
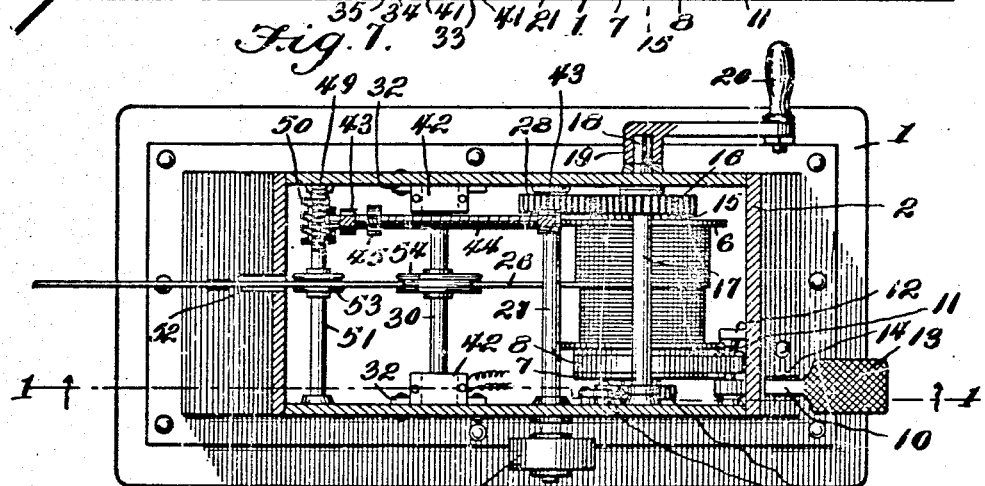
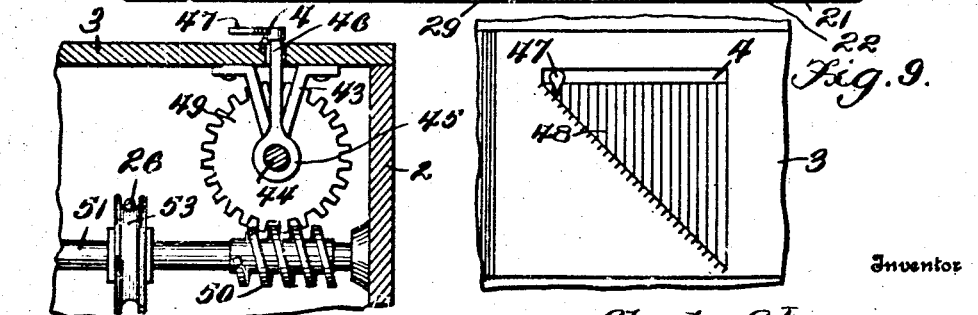
Witnesses
J. T. L. Wright
Inventor
Charles S. Lenz,
By Victor J. Evans,
Attorney

UNITED STATES PATENT OFFICE.

CHARLES S. LENZ, OF NEW YORK, N. Y.

SOUNDING APPARATUS.

959,764.     Specification of Letters Patent.     Patented May 31, 1910.

Application filed March 13, 1909. Serial No. 483,222.

*To all whom it may concern:*

Be it known that I, CHARLES S. LENZ, a subject of the King of Sweden, residing at New York, in the county of New York and State of New York, have invented new and useful Improvements in Sounding Apparatus, of which the following is a specification.

This invention relates to a sounding apparatus adapted for use upon ships or water craft, and has for an object to provide an apparatus of this character with simple means for paying out the desired amount of cable to which is attached a novel form of trailer designed to travel behind and below a ship and to be automatically raised to the surface of the water, carrying with it a quantity of ground which may be tested by the captain of the ship.

A further object of this invention is to provide simple and novel means for automatically sounding an alarm when the ship is in shoal water and to automatically raise the trailer simultaneously with the sounding of the alarm.

Other objects and advantages will be apparent as the nature of the invention is better set forth, and it will be understood that changes within the scope of the claims may be resorted to without departing from the spirit of the invention.

Figure 1:
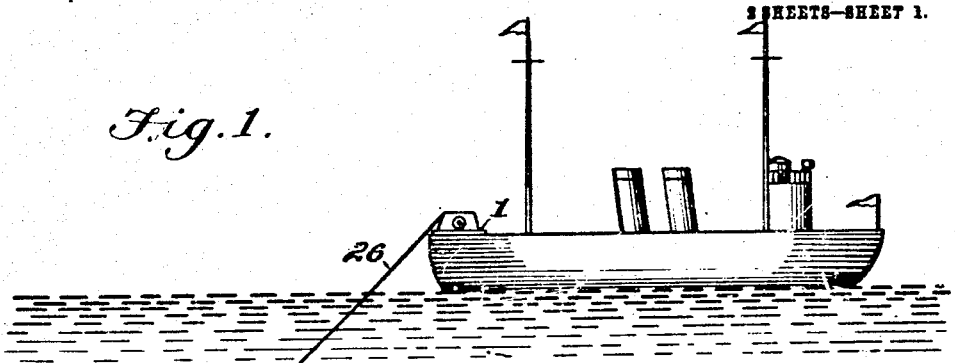
Figures 2, 4:
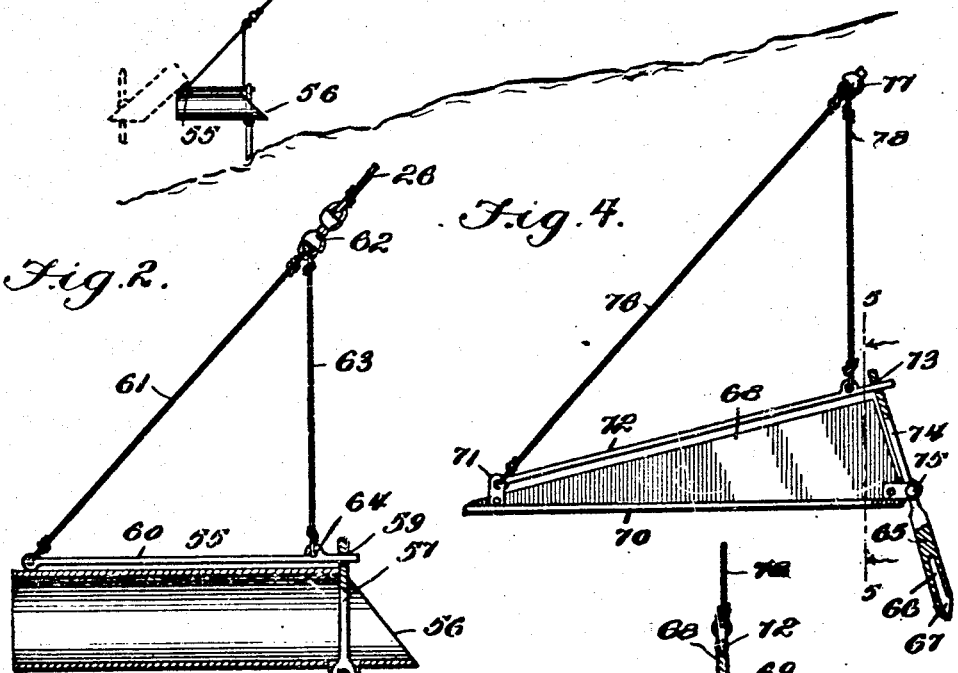
Figure 5:
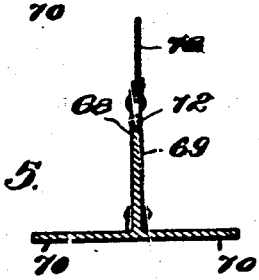
Figure 3:
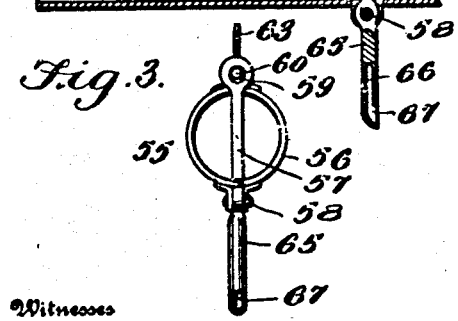

In the drawings, forming a portion of this specification and in which like numerals of reference indicate similar parts in the several views:—Figure 1 is a diagrammatic view showing a ship and the trailing apparatus connected therewith. Fig. 2 is a longitudinal section taken through the trailer. Fig. 3 is a front end view of the trailer. Fig. 4 is a side view of a modified form of trailer. Fig. 5 is a vertical section taken on the line 5—5 of Fig. 4. Fig. 6 is a longitudinal section through the reeling apparatus taken on the line 1—1 of Fig. 7. Fig. 7 is a horizontal section taken on the line 2—2 of Fig. 6. Fig. 8 is a detail section showing the connections between the driven pointer carrying screw and the operating worm therefor. Fig. 9 is a plan view of a portion of the casing for the reeling apparatus showing the pointer and the coöperating depth indicating scale.

Referring now more particularly to the drawings, and with particular reference to Figs. 6 to 9, there will be seen a reeling apparatus comprising a base plate 1 supporting a casing or inclosure 2 of desired shape but which, as shown, is provided in this instance with a flat top 3 having a longitudinally disposed slot 4 formed therein for a purpose to be hereinafter more fully described. The casing is provided with a horizontally disposed shaft 5 upon which is secured a reel 6 provided at one side with a grooved hub 7 to which is connected a brake band 8 having its free end connected at 9 to a lever 10 which is pivoted at 11 to a bracket 12 secured to one wall of the casing. The lever is provided with a serrated foot engaging portion 13 and is disposed outwardly of a slot 14 formed in the wall of the casing to which is attached the bracket 12. The shaft 5 is provided with a gear wheel 15 in mesh with a gear wheel 16 upon a shaft 17 located in spaced parallel relation to the shaft 5 and directly above the same. The shaft 17 is journaled in a suitable manner in the side walls of the casing and is provided at one end with a squared portion 18 to receive the socket 19 of a crank handle 20. The shaft 5 is provided with a ratchet wheel 21 adapted to be engaged by a spring pressed pawl 22 pivotally mounted on one wall of the casing and to which is connected the lower end of a flexible element 23. The upper end of the element 23 is connected to one end of a lever 24 pivoted intermediate of its ends to a bracket as shown at 25 at the top of the casing. By providing the crank handle 20, it is obvious that the shaft 5 may be manually rotated to wind the cable 26 onto the reel 6. To provide means whereby the cable may be wound upon the drum by a motor or the like I provide adjacent to the shaft 17 a shaft 27 having a pinion 28 mounted thereon to mesh with the gear wheel 16 upon the shaft 17. The shaft 27 is provided outwardly of the casing with a band pulley 29 for receiving an endless belt, not shown.

Rearwardly of the shaft 15 is shown a shaft 30 having at its ends insulated blocks or elements 31 slidable in guideways 32 secured to the side walls of the casing as clearly shown in Fig. 7 of the drawings. One of the guideways is provided with an insulated block or element 33 provided with a contact plug 34 disposed directly in line with a contact element or plug 35 carried by one of the blocks 31 upon the shaft 30. A battery is indicated at 36 and is connected by means of a wire 37 to the contact plug or element 34, and a similar wire is shown at 38 which is connected at one end to the plug or contact element 35 and at the other end this last named wire is connected to a bell or suitable signal 39. A wire 40 is also connected with the bell and with the battery to complete the circuit. The guideways 32 preferably consist of vertically extending parallel spaced members 41 connected at their upper ends by tops or cross pieces 42. Helical springs are confined between the tops 42 and the insulated blocks 31 carried by the shaft 30 the purpose of which being to normally hold the shaft 30 at the downward limit of its movement when the cable 26 is slack so that a perfect connection is formed between the contact blocks 34 and 35 respectively.

Alining brackets 43 depend from the top 3 of the casing and these brackets support a longitudinally extending screw 44 having engaged therewith the hub 45 of an arm 46, the latter being provided with a pointer 47. The arm 46, at its upper end is slidable in the slot 4 formed in the top of the casing, and the pointer which is carried by this arm is adapted for coöperating with a depth indicating scale 48 upon the top of the casing. The screw 44 is provided with a gear wheel 49 in mesh with a worm gear 50 upon a shaft 51 journaled at its ends between the side walls of the casing. The rear wall of the casing is provided with a slot 52 for receiving the cable 26 which in practice, and as is clearly shown in Fig. 6 of the drawings, is passed over a grooved wheel 53 upon the shaft 51 and under a groove wheel 54 upon the shaft 30 and is finally connected with the reel 6.

A trailer 55 is shown in Figs. 1, 2 and 3 of the drawings and consists preferably of an elongated tubular member which is open at both ends and which is preferably provided with a pointed front end 56, as shown. An arm 57 is pivotally connected at 58 to the trailer and is provided at its upper end with an aperture 59 which receives one end of a locking element 60 pivotally mounted in any suitable manner to the trailer and to which is connected one end of a cable 61. The cable 61 is provided at its upper end with a swivel 62 connected with the cable 26. The swivel 62 has depending therefrom a flexible element 63 connected at its lower end to the locking element as shown at 64. The arm 57 is provided with a depending portion 65 having a channel 66 formed therein provided at its lower end with a scoop shaped mouth 67.

The modified form of trailer shown in Figs. 4 and 5 of the drawings, consists of an element 68 of inverted T-form comprising a longitudinally extending vertical web 69 and outwardly extending flanges 70. The web portion 69 is preferably of wedge form as clearly shown in Fig. 4 of the drawings, and at its reduced rear end is provided with a bracket 71 to which is pivotally connected one end of a locking element 72, the other end of said element being engaged in a passage 73 in the upper end of an arm 74 which is identical in construction to the arm 57 and which is pivoted in a similar manner to the trailer 68 at 75. The bracket 71 has secured thereto the lower end of a flexible element 76, the upper end being connected to a swivel 77. The swivel 77 is connected to an element 78 similar to the element 63 and as shown this element is connected at its lower end to the locking element 72.

In operation of the apparatus, the casing 2 is placed upon the stern of the boat as diagrammatically shown in Fig. 1 of the drawings, and upon movement of the boat the cable is unreeled paying out the desired amount of cable as will be readily understood. When it is desired to release the reel or to allow the shaft 5 to rotate, the lever 24 is operated manually to disengage the pawl 22 from the ratchet wheel 21, and by the provision of the trailer it will be seen that the cable will be automatically unwound from the said reel. When the cable is being unreeled it will be understood that through reason of the fact that it travels over the pulley 53 it will rotate the shaft 51 and by means of the geared connection between this shaft and the screw 44 as previously described, it will be seen that said screw will be rotated so that the arm 46 will travel longitudinally thereon in order that the pointer 47 will coöperate with the degree or scale marks upon the top 3 of the casing to indicate the depth of water in which the trailer is located. When the apparatus is in operation, the cable 26 rearwardly of the pulley 53 lies approximately at an angle of 45° with respect to the base 1, and the trailer travels at the rear of the stern of the boat and in parallel relation with respect to the boat with its arm 57 extending downwardly at right angles to the bottom of the trailer. When the lower end of the arm 57 comes in contact with ground the upper end will be thrown outwardly and forwardly to release the locking member 60, allowing the trailer to assume the dotted line position shown in Fig. 1 of the drawings, so that it may float or rise to the surface of the water. As soon as the trailer rises to the surface it will relieve the tension of the cable against the pulley 54 upon the shaft 30, and by the provision of the springs carried by the guide ways and which are engaged with the insulated blocks 31 it will be seen that by reason of the fact that the shaft 30 is carried by said blocks it will be carried or moved downwardly so that the contact plug or element 35 will engage the contact plug or element 34 thus closing the electrical circuit and ringing the bell or element 39 so that the captain or other occupant of the boat will be notified that the trailer has reached ground and is traveling behind the stern of the boat upon the surface of the water, where it may be pulled in as will be readily understood. As stated, the channel 66 and the mouth 67 are provided to collect ground so that it may be examined when the trailer is moved into the boat. A switch 79 is located in the electrical circuit adapted to be actuated so that the circuit can be closed when the trailer has reached bottom.

I claim:—

1. An apparatus of the class described comprising a reel, a cable wound upon the reel, a shaft, a fixed electrically connected contact element, a movable electrically connected contact element, an alarm, an electric source, a trailer carried by the cable, and connections between the contact element and the said source and alarm respectively.

2. In a sounding apparatus, a cable, a trailer carried by the cable, a locking member carried by the trailer, and a pivoted member carried by the trailer and adapted to be engaged with the said locking member so that the said pivoted member will lie at right angles to the trailer.

3. In a sounding apparatus, a cable, a trailer carried by the cable, an arm carried by the trailer and adapted for engagement with the same to hold it at times in a horizontal position, and a scoop carried by said arm and disposed normally at right angles to the trailer.

4. In a sounding apparatus, a cable, a swivel at one end of the cable, a trailer, connections between the swivel and the trailer, a pivotally mounted arm carried by the trailer and adapted to hold the same at times in a horizontal position, and a scoop carried by the arm and disposed normally beneath the trailer and at right angles thereto.

5. In a sounding apparatus, a cable, a trailer connected with the cable adapted to assume a horizontal position, and obstruction operated means when the trailer assumes a horizontal position whereby the trailer will be free for angular swinging movement and free to rise to the surface of the water.

6. A sounding apparatus comprising a cable, a trailer, a pivotally mounted locking element upon the trailer, connections between the locking element and the said cable, and a scoop carried by the trailer and operatively connected with the said locking element so that the scoop assumes a position at right angles to the trailer when the latter is in its operative horizontal position.

7. In a sounding apparatus, a cable, a trailer comprising an elongated tubular member open throughout its length and provided with a pointed front end portion, a scoop carried by the trailer, and means operatively connected with the cable and with the trailer for holding the scoop in its operative position.

8. An apparatus of the class described comprising a drum carried cable, a fixed electrically connected contact element, a movable electrically connected contact element, depth indicating means, said cable being operatively connected with the movable contact element and adapted to be held out of engagement with the fixed contact element, said cable also being operatively connected with the said indicating means so as to operate the same when the said contact elements are out of engagement with each other, an electric source, and an arm connected with the said source and with the contact elements.

9. In a sounding apparatus, a fixed electrically connected contact element, a vertically movable electrically connected contact element, depth indicating means, a trailer, and a cable connected with the trailer and operatively connected with the depth indicating means and with the said movable electrically connected contact element so that the latter is held out of engagement with the fixed element when the cable is taut.

In testimony whereof I affix my signature in presence of two witnesses.

CHARLES S. LENZ.

Witnesses:
T. RORK,
FRANK A. LEE.